United States Patent [19]

Otremba et al.

[11] Patent Number: 5,568,766
[45] Date of Patent: Oct. 29, 1996

[54] METHOD FOR CONTROLLING THE DRIVE FOR A HYDRAULIC PRESS HAVING A PLURALITY OF OPERATING PHASES

[75] Inventors: Carsten Otremba, Esslingen; Guenther Schaich, Kirchheim-Teck; Joachim Beyer, Ravensburg, all of Germany

[73] Assignee: Maschinenfabrik Mueller-Weingarten AG, Weingarten, Germany

[21] Appl. No.: 297,889

[22] Filed: Aug. 30, 1994

[30] Foreign Application Priority Data

Sep. 2, 1993 [DE] Germany ................... 43 29 480.4

[51] Int. Cl.⁶ ............................. B30B 15/16; B30B 15/24
[52] U.S. Cl. ..................... 100/35; 60/413; 72/453.02; 72/453.18; 83/639.5; 100/46; 100/99; 100/258 R; 100/269.06; 100/269.14
[58] Field of Search ................... 100/46, 35, 99, 100/258 R, 269.05–269.08, 269.1, 269.14; 72/453.02, 453.06, 453.18; 83/639.5; 60/413–418

[56] References Cited

U.S. PATENT DOCUMENTS

| | | | |
|---|---|---|---|
| 2,283,168 | 5/1942 | Ernst et al. | 100/269.14 |
| 2,312,213 | 2/1943 | Ferris | 100/269.06 |
| 2,946,303 | 7/1960 | Schmmid | 100/269.05 |
| 3,683,666 | 8/1972 | Hassel | 100/269.07 |
| 4,022,096 | 5/1977 | Forichon | 100/269.05 |
| 4,470,287 | 9/1984 | Antonov et al. | 72/453.02 |
| 4,524,582 | 6/1985 | Lucas et al. | 60/421 |
| 4,707,988 | 11/1987 | Palmers | 60/413 |
| 4,953,458 | 9/1990 | Day | 100/269.1 |
| 5,170,716 | 12/1992 | Durand et al. | 105/199.2 |

FOREIGN PATENT DOCUMENTS

| | | |
|---|---|---|
| 0116024 | 8/1984 | European Pat. Off. . |
| 0615837 | 9/1994 | European Pat. Off. . |
| 3-19811 | 1/1991 | Japan . |
| 623624 | 9/1978 | U.S.S.R. ............... 72/453.02 |

OTHER PUBLICATIONS

Manfred Weck: "Werkzeugmaschinen" [Machine tools]; vol. 1, pp. 103–105, no date.

*Primary Examiner*—Stephen F. Gerrity
*Attorney, Agent, or Firm*—Spencer & Frank

[57] ABSTRACT

A method for controlling the drive of a hydraulic press and an associated device for carrying out the method are proposed, the piston/cylinder unit belonging to a press ram being driven via several hydraulic devices connected in series. Depending on the operating phase of the press, the hydraulic devices are here used as required either as hydraulic motors or hydraulic pumps, which effect a delivery of pressure medium into the respective cylinder chamber.

19 Claims, 3 Drawing Sheets

5,568,766

METHOD FOR CONTROLLING THE DRIVE FOR A HYDRAULIC PRESS HAVING A PLURALITY OF OPERATING PHASES

BACKGROUND OF THE INVENTION

The invention relates to a method for controlling the drive of a hydraulic press including the steps of providing a piston/cylinder unit having a piston connected to a press ram, a first cylinder chamber located below the piston, and a second cylinder chamber acted upon by the piston. The piston is acted upon by a hydraulic medium for displacing the ram press.

In hydraulic presses the press ram is connected to one or more piston/cylinder units. Important parameters of the hydraulic drive are the pressure and the delivery rate of the pressure medium. Both parameters can be adapted to the respective work procedure by means of appropriate pumps and control devices (power, pressure and stroke controllers). Depending on the type of drive a distinction is made between hydraulic presses with direct pump drive and hydraulic presses with accumulator drive (see, for example, Manfred Weck: Werkzeugmaschinen [Machine tools] Vol.1, pages 103 to 105). In the case of direct drive, a fixed-displacement pump or variable-displacement pump (hydraulic pump) driven by an electric motor acts on the main working cylinder, for generating the press force, is acted upon with pressure medium on the large cylindrical piston surface and, for lifting the ram, is acted upon with pressure medium on the smaller ring surface of the piston of the piston/cylinder unit. The pump and the drive motor must always be designed for the maximum power requirement of the press. The high-pressure pump can in this case be designed as a variable-displacement pump or variable hydraulic pump in order to permit a stepless variation of the delivery rate and, consequently, of the ram speed. Accordingly, at low pressure a large quantity of fluid is delivered and as a result a great speed is imparted to the press tool, and vice versa. This is expedient for a quick stroke as rapid traverse and for a high force impact during the shaping procedure. However, a disadvantage is that the drive energy of the pump is constantly changing between zero and a maximum value. This results in considerable loads on the mains supply. A further disadvantage of the direct drive is that the potential energy of the ram and of the downwardly moved masses of the system remains unused, since the pressure medium flowing out from the annular cylinder during the downward movement of the piston is simply let off via a directional valve into a tank or oil container.

Another drive variant for hydraulic presses is the accumulator drive. Here, a fixed-delivery pump driven by an electric motor delivers first into a high-pressure accumulator, from which the working cylinder is then fed with the storage pressure via a proportional valve. However, this high storage pressure is available during the entire downward stroke movement and, thus, also already during the so-called rapid traverse, with a lower energy requirement per se. The actual shaping of the workpiece, with the high shaping force which is necessary for this and which is generated by the storage pressure, takes place only on the substantially smaller working stroke after the rapid traverse.

For the subsequent downward stroke, the accumulator must again be charged with the high energy or pressure which is utilized only to a small extent. This requires, for the charging pump, a correspondingly high electrical drive power.

Thus, in the case of the accumulator drive the overall energy balance is extremely unfavorable, and in practice degrees of utilization of approximately 20% to 30% are achieved.

Furthermore, in the accumulator drive of known presses the potential energy of the downwardly moving parts is not exploited, i.e. the hydraulic medium to be displaced is let off into oil containers. A recovery of the kinetic energy of the pressure medium flowing out from the piston/cylinder unit is not provided for.

The inflow of pressure medium through the hydraulic pump or hydraulic accumulator to the hydraulic cylinder of the press and the outflow of pressure medium from the annular cylinder chamber below the piston are controlled via multiway valves.

SUMMARY OF THE INVENTION

The invention is based on the object of proposing a novel method for controlling the drive of a hydraulic press, as well as an associated press in which the disadvantages mentioned in respect of the systems described above are avoided. A particular aim is to control the press using a hydraulic accumulator, this permitting a high degree of efficiency upon optimal operation. A further object of the invention is to provide for as economical as possible a use of control and drive members when using several piston/cylinder units on presses.

According to the invention, this object is achieved, by using a method including the steps of utilizing an operating phase in which potential energy associated with a raised, unloaded press ram is stored. The operating phase includes the steps of allowing the press ram to move downward to drive the piston. A hydraulic medium is forced to flow from the first cylinder chamber, through a first hydraulic device, and into the second cylinder chamber using the piston. The first hydraulic device is operated as a first hydraulic motor using the hydraulic medium forced therethrough. A second hydraulic device is driven using the first hydraulic motor to cause the second hydraulic device to pump additional hydraulic medium into an accumulator unit to charge the accumulator unit so that the potential energy associated with the downward movement of the unloaded press ram is stored. The accumulator unit is further charged with the additional hydraulic medium using a third hydraulic device. The method also includes the step of utilizing a subsequent shaping or machining phase, comprising the steps of using the charge within the accumulator unit to at least partially cause the additional hydraulic medium therein to flow through the second hydraulic device, and causing the second hydraulic device to operate as a second hydraulic motor. The first hydraulic device is driven using the second hydraulic motor to cause the first hydraulic device to pump the hydraulic medium into the second cylinder chamber, whereby the piston effects an additional pressure actuation on the press ram.

Advantages of the invention:

The invention is based on the central concept of realizing and optimizing the principle of so-called "secondary control" for a hydraulic press drive. In contrast to the known control of the pressure level delivered in the press cylinder by means of a pressure medium pump or proportional valve control, "secondary control" envisages the power output being effected via a change in the volume flow of the hydraulic medium by means of suitable hydraulic devices and accumulator devices, with the pressure level remaining constantly high. This corresponds to a direct-current motor control with preset supply voltage and controlled current flow. The change in volume flow is effected in this case via adjustable hydraulic motors which are acted upon with pressure medium from a pressure accumulator.

Using "secondary control" the piston/cylinder unit for driving the press ram can be decoupled as it were from the direct pressure actuation of the pressure accumulator, i.e. the energy transfer to the piston/cylinder unit takes place via the controllable hydraulic motor. If, for example, the piston/cylinder unit in the rapid traverse at low pressure requires a high volume flow as power, then the latter can be generated by means of the "secondary unit" by virtue of the fact that only a small volume flow is supplied to a hydraulic motor at a high pressure level. Conversely, during the shaping of the workpiece, a high pressure is required in the piston/cylinder unit, at low volume flow, i.e. relatively low piston speed. This is generated by the secondary unit, at an applied high pressure level, by means of an appropriate increase in the volume flow passing the hydraulic motor. In this way the high efficiency of the charged accumulator is maintained.

Accordingly, the advantages of the invention lie, inter alia, in a very simple speed control of the press ram in the series-connected rapid traverse, which can be influenced via a speed control and swivel angle adjustment of a variable-displacement pump.

Furthermore, the accumulator can also serve at the same time for accumulating excess energy (potential energy), i.e. energy-saving is also provided for by exploiting the potential energy of ram and top tool as the ram moves downward.

An additional pump drive charges the accumulator to the necessary pressure for applying the maximum press force.

When using several hydraulic cylinders on the ram, a very effective parallel control of the ram can be achieved, which in turn can take place by means of displacement of the respective variable-displacement pumps in combination with speed and travel measurement.

Another particular feature of the circuit according to the invention lies in an efficient force control via the torque on the drive shaft of the drive pump for pressure actuation of the piston/cylinder unit by means of a hydraulic pump with adjustable swivel angle.

A further advantage is that several presses arranged in parallel can also be fed from a central energy supply.

BRIEF DESCRIPTION OF THE DRAWINGS

Further details and advantages of the invention are explained in greater detail in the following description of the method and of the device, with reference to the figures, in which.

DETAILED DESCRIPTION OF THE INVENTION

Figure 1:
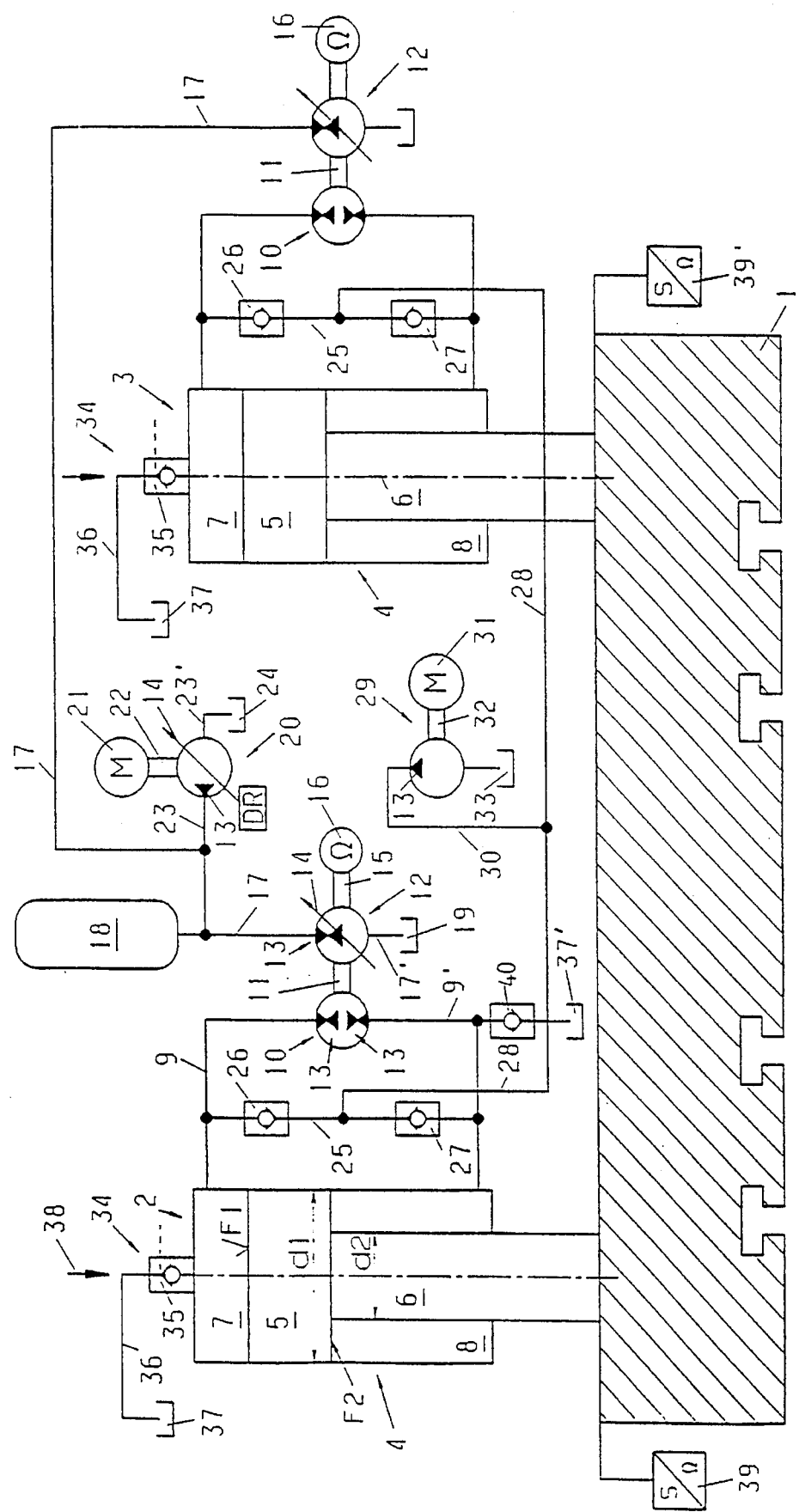
FIG. 1 shows a schematic representation of a hydraulic press with control members for controlling the press in the manner according to the invention.

FIG. 1 represents a press ram 1 for a hydraulic press (not shown), which press ram 1 receives, on its underside, a top tool (not shown). The upward and downward movement of the press ram 1 is achieved by hydraulic means via two hydraulic cylinders or piston/cylinder units 2, 3 which engage laterally on the press ram and which serve as lifting and working cylinders for carrying out the shaping or cutting of the workpiece. Instead of two lateral hydraulic cylinders 2, 3, four hydraulic cylinders can also be provided as press cylinders arranged in the corner areas of the press ram 1, which press cylinders would be arranged, in the representation in the figure, in each case behind the hydraulic cylinders 2, 3 shown. It is also possible to provide only one working cylinder engaging centrally on the press ram.

The two hydraulic cylinders or piston/cylinder units 2, 3 are arranged symmetrically on the press ram 1 and are equipped with symmetrically arranged control members for controlling each hydraulic cylinder 2, 3. The construction and the mode of functioning of the press drive is therefore described with reference to the hydraulic drive shown on the left in FIG. 1.

Accordingly, each piston/cylinder unit or each hydraulic drive 2, 3 has a working cylinder 4 inside which a working (driving) piston 5 is moved upward and downward. The working piston 5 has, on its lower side, a piston rod 6 which is connected to the press ram 1. Above the working piston 5 there is a cylinder chamber 7 which has a circular cylindrical cross section, and below the working piston 5 there is a cylinder chamber 8 of annular cross section. The effective circular cylindrical upper contact surface $F_1$ on the working piston 5 is accordingly determined by the diameter $d_1$ of the working piston 5. The effective lower annular contact surface $F_2$ is formed by the surface difference between the diameter $d_1$ of the working piston 5 and the diameter $d_2$ of the piston rod 6.

The upper cylinder chamber 7 is connected to the lower cylinder chamber 8 via a hydraulic line 9, 9'. A first hydraulic device 10 which can operate as a pump or as a motor is introduced into this hydraulic line 9 and can, as indicated by the symbols 13 marked in, work both as a pump and as a motor in each case in two directions of flow. An adjustability of this hydraulic device is in this case unnecessary, i.e. it is designed to operate constantly. The mode of action is explained hereinafter in context.

The first hydraulic device 10 is connected via a drive shaft 11 to a second hydraulic device 12 which, as indicated by the symbol 13, works as a pump in one direction of flow and as a motor in the opposite direction of flow, which is in turn shown by the symbols (black triangles 13) in the same way as in the case of the first hydraulic device 10. The arrow 14 running obliquely through the second hydraulic device 12 indicates the adjustability of this second hydraulic device, i.e. it is provided with a swivel angle adjustment which permits a variable passage of the volume flow.

The second hydraulic device 12 is connected via a drive shaft 15 to a speed measurement system 16 which determines the speed of the second hydraulic device 12 and, consequently, the drive of the first hydraulic device 10.

The adjustable second hydraulic device 12 is connected via a first hydraulic line 17 to a hydraulic accumulator 18 and via a second line 17' to an unpressurized oil container or tank 19. Also connected to the line 17 is a third hydraulic device 20 which operates only as a variable, pressure-controlled pump and which is driven by an electric motor 21 via a drive shaft 22. A first hydraulic line 23 leads to the hydraulic line 17, and a second hydraulic line 23' leads to the associated unpressurized oil container or tank 24 with hydraulic medium. The arrow 14 running through the pump representation again represents the adjustability or controllability. A black triangle 13 in the pump indicates the mode of action as pump.

The connection line 9, 9' between the upper cylinder chamber 7 and the lower cylinder chamber 8 is crossed by a parallel connection line 25 which has two nonreturn valves 26, 27 working in opposite directions and with appropriate symbols. The nonreturn valves open here in the direction of the respective cylinder chamber 7, 8.

Opening into the connection line 25, between the two nonreturn valves 26, 27, is a further hydraulic line 28 which is connected to a fourth hydraulic device 29 via a connection line 30. This fourth hydraulic device 29 is designed as a simple fixed-delivery pump without adjustment device, i.e. it acts only as a feed pump in one direction of delivery, with an electric motor 31 driving it via a drive shaft 32. By this means hydraulic medium is delivered from a tank 33 into the hydraulic line 30, 28. The black triangle 13 in the pump representation of the hydraulic device 29 indicates the non-variable pump function.

The upper cylinder chamber 7 of the piston/cylinder unit 2, 3 is provided with an additional prefill device 34 which serves to compensate for the different filling volume of the two cylinder chambers 7, 8 during the movement of the working piston 5. Since there is no piston rod 6 in the upper cylinder chamber 7, a difference in volume of the hydraulic medium displaced in the two cylinder chambers 7, 8 arises. For this purpose the prefill device 34 has a nonreturn valve 35 to be opened externally and a hydraulic line 36 leading to an oil container 37. The arrow 38 shows a direction of flow through the nonreturn valve 35.

As can be seen from FIG. 1, the lower cylinder chamber 8 of the piston/cylinder unit 4 is connected via the pressure medium line 9' to an oil container 37', which is coupled via a nonreturn valve 40 to the line 9'. The oil container 37' can correspond to the oil container 37 of the prefill device 34.

The press ram 1 has preferably two or more displacement measuring devices 39, 39' which record the movement of the press ram 1 at various points and can thus carry out a determination of parallelism.

Figure 2:
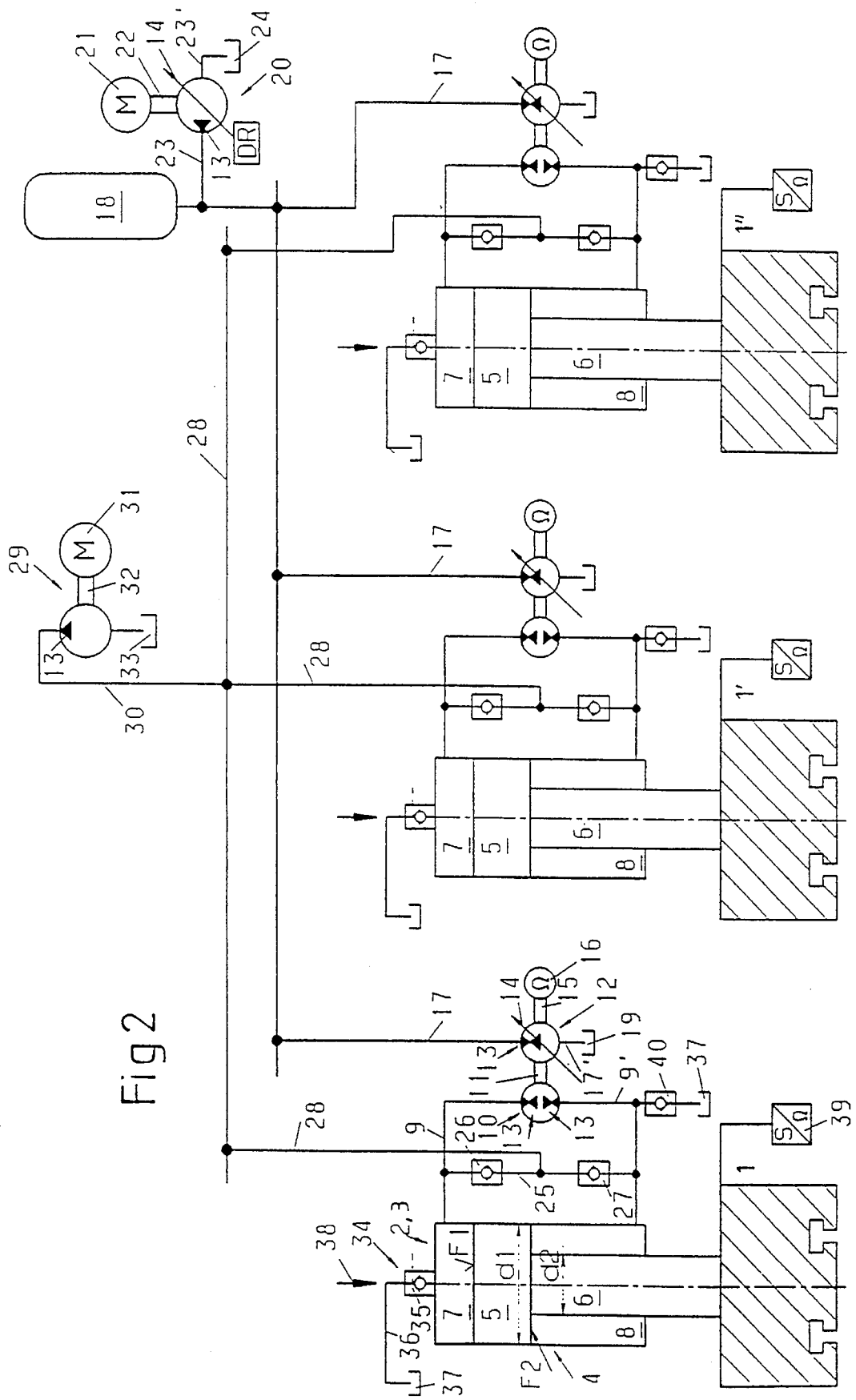
FIG. 2 shows a schematic representation of several rams or hydraulic presses with central supply by hydraulic medium.

As can be seen from FIGS. 1 and 2, the above-described adjustment and control devices on the piston/cylinder units 2, 3 are in each case of identical design and of identical action, the pressure accumulator 18 and the hydraulic devices 20 and 29 serving as components common to all piston/cylinder units 2, 3. Accordingly, for example, three individual ram units 1, 1', 1" are represented in FIG. 2, these being able to comprise in each case, for example, individual or several piston/cylinder units 2, 3. These ram units can be arranged in a single press beside one another or as several individual presses. According to the representation in FIG. 2, all the ram units have a central pressure supply consisting of the single central pressure accumulator 18, with connected hydraulic device 20 and central supply line 17, and of the hydraulic device 29 with pressure medium line 28 as system charging pump. By means of this measure of the central pressure supply, which is connected via a respective secondary device 10, 12 to the individual press, a considerable saving in energy and a considerably lower constructional outlay are possible.

The press drive device according to the invention operates as follows:

Phase 1:

Phase 1 concerns the downward movement of the piston 5 of the piston/cylinder unit 2, 3 from its upper starting position, i.e. the downward movement of the ram 1 from its uppermost position of reversal in the direction of the workpiece. For this purpose a hydraulic medium, for example hydraulic oil, is present in the upper cylinder chamber 7 and in the lower cylinder chamber 8. The system is charged with pressure medium in advance via the fourth hydraulic unit 29 which is designed as system charging pump and whose drive motor 31 drives the fixed-delivery pump 29 and delivers hydraulic medium from the tank 33 via the hydraulic lines 30, 28, 25 and via the nonreturn valves 26, 27 into the two cylinder chambers 7, 8. The fixed-delivery pump 29 here operates at a low pressure of, for example, 5 bar.

The downward movement of the piston 5 takes place in phase 1 in a rapid traverse at a predetermined downward speed. Following interrogation of the speed measuring system 16, the second hydraulic device 12 is correspondingly adjusted by processor control. In this downwardly directed movement phase of the working piston 5, the pressure medium present in the cylinder chamber 8 is delivered via the hydraulic line 9' through the first hydraulic device 10 and passes via the continuing hydraulic line 9 into the upper cylinder chamber 7. Since the fluid volume displaced by the piston 5 during the downward movement is smaller, because of the piston rod 6 present, than the volume arising in this case above the piston 5, the difference between the volume displaced from the cylinder chamber 8 and the volume arising in the cylinder chamber 7 must be supplied from the prefill device 34 via the nonreturn valve 35. Hydraulic medium is in this case suctioned from the oil tank 37 via the hydraulic line 36 so that the cylinder chamber 7 also fills completely with hydraulic medium.

The downward movement of the working piston 5 occurs on account of the potential energy of all downwardly moving parts, which are represented in particular by the weight of the press ram 1 with associated top tool and the downwardly moving parts of the piston/cylinder unit 2, 3. The hydraulic medium present in the lower cylinder chamber 8 is accordingly forced out from this chamber 8 by the inherent weight of these parts and drives, during the downward movement, the first hydraulic device 10 as hydraulic motor. The energy released in this way is accordingly transmitted from the hydraulic motor 10 to the drive shaft 11 and from there to the second hydraulic device 12 working as a variable-displacement hydraulic pump. The hydraulic pump 12 can, on the basis of its swivel angle adjustment 14, control the extent of the energy flow from the hydraulic pump 10 and, consequently, the movement of the press ram by processor means. In particular, the press ram can be braked again before impacting on the workpiece.

The potential energy being released by the downward movement of the ram thus drives the second hydraulic device 12 as hydraulic pump in such a way that pressure medium is delivered from the oil tank 19 via the line 17' to the variable-displacement hydraulic pump 12 and from there via the hydraulic line 17 to the hydraulic accumulator 18. The hydraulic accumulator 18 is thus charged with pressure medium, i.e. brought to a higher energy level, by means of the downward movement of the press ram 1. In this way the potential energy being released is accumulated in the system. The additional charging of the hydraulic accumulator 18 to the pressure (nominal pressure) necessary for the shaping is effected by means of the third hydraulic device 20.

Phase 2:

The second operating phase concerns the actual shaping or cutting of the workpiece, i.e. the actual working stroke, in which a high press force is necessary. In this phase the press ram 1 is moved further downward at a greatly reduced working speed, in which case an additional pressure actuation in the upper cylinder chamber 7 above the working piston 5 is necessary for carrying out the shaping. To this end, the mode of working of the first hydraulic device 10 and of the second hydraulic device 12 is reversed, i.e. the first hydraulic device 10 working as hydraulic motor in the first phase becomes a hydraulic pump, and the second hydraulic device 12 working as hydraulic pump in the first phase now acts as hydraulic motor. The pressure actuation of the system and in particular of the upper cylinder chamber 7 is accordingly effected by means of the first hydraulic device 10 as hydraulic pump. In this function the second hydraulic device 12 as hydraulic motor is acted upon by the pressure from the hydraulic accumulator 18 in accordance with the pressure predetermined by the hydraulic pump 20. The adjustable swivel angle 14 of the hydraulic motor 12 determines the extent of the volume flow V through the hydraulic motor 12 and, consequently, the power output to the drive shaft 11 leading to the hydraulic pump 10 and, consequently, the volume flow through the hydraulic pump 10 for generating a high pressure in the cylinder chamber 7.

The necessary and required pressure level (nominal pressure) could also be built up by means of, in addition to the accumulator 18, the third hydraulic device 20, which works as a pressure-regulated variable-displacement hydraulic pump insofar as the accumulator 18 is still not at nominal pressure. Accordingly, by means of this pressure build-up, the second hydraulic device 12 is operated as a variable-displacement hydraulic motor which in turn drives the first hydraulic device 10 as hydraulic pump via the drive shaft 11, so that hydraulic medium is continuously delivered from the lower cylinder chamber 8 and/or from the oil container 37' with nonreturn valve 40 into the upper cylinder chamber 7. The first hydraulic device 10 working as hydraulic pump thus builds up, in the upper cylinder chamber 7, the working pressure necessary for the shaping. By virtue of the nonreturn valve 35, the pressure medium cannot escape to the outside.

The necessary driving torque on the drive shaft 11 for the first hydraulic device 10 results from the relationship between the pressure of the hydraulic accumulator 18 and the set volume flow V of the second hydraulic device 12. The volume flow is set, in each case as a function of the shaping force necessary at the time, by means of the swivel angle adjustment 14 of the pump 12.

Phase 3:

In the third operating phase, after the shaping of the workpiece has been carried out, the press ram 1 is moved back into its upper starting position. To this end, the pressure medium must be pumped from the upper cylinder chamber 7 into the lower cylinder chamber 8, the first hydraulic device 10 being again operated as a hydraulic pump which is driven by the second hydraulic device 12 serving as hydraulic motor. This is achieved by means of the high accumulated energy of pressure medium present in the hydraulic accumulator 18, which energy drives the hydraulic motor 12 at high pressure with a low volume flow and, consequently, the hydraulic pump 10 with a high volume flow at low pressure, in such a way that the pressure medium is conveyed from the upper cylinder chamber 7 into the lower cylinder chamber 8 of each piston/cylinder unit 2, 3. To this end, a reversal of the direction of the delivery flow in the first hydraulic device 10 is necessary (see corresponding black triangles 13). On account of the low driving torque necessary for the hydraulic pump 10, only a low volume flow need be set for the hydraulic motor 12.

Since excess pressure medium is present in the upper cylinder chamber 7 on account of the larger volume, the medium is conveyed through the pressure medium line 36 and into the oil tank 37 by means of the nonreturn valve 35 to be opened externally.

The shaping of the workpiece, which shaping is dependent on the travel of the ram, requires a certain shaping force or a certain shaping force profile. This force profile can be set very easily, in accordance with the pressure build-up in the cylinder chamber 7, by means of the control system according to the invention, in which in particular the second hydraulic device 12 is equipped with an adjustment device or swivel angle adjustment 14. The swivel angle adjustment of the third hydraulic device 20 in this case generates the necessary maximum pressure level in the hydraulic accumulator 18, which acts on the pressure medium pump 10 by way of the hydraulic motor 12 with adjustable swivel angle. Thus, in accordance with the principle of secondary control, a high and constant pressure level is set, and the volume flow of the hydraulic medium is controlled during shaping by way of the hydraulic pump 12 with adjustable swivel angle. The volume flow through the hydraulic pump 12 accordingly determines the driving power on the drive shaft 11 leading to the hydraulic pump 10. The speed measuring device 16 in this case controls, in conjunction with the displacement measuring device 39, 39', the uniformity and thus the parallelism of the piston/cylinder units 2, 3 and of the press ram 1.

Using the press control system according to the invention, the electrical driving power to be installed is considerably below that which is needed in normal, direct-driven and, in particular, accumulator-driven presses.

Figure 3:
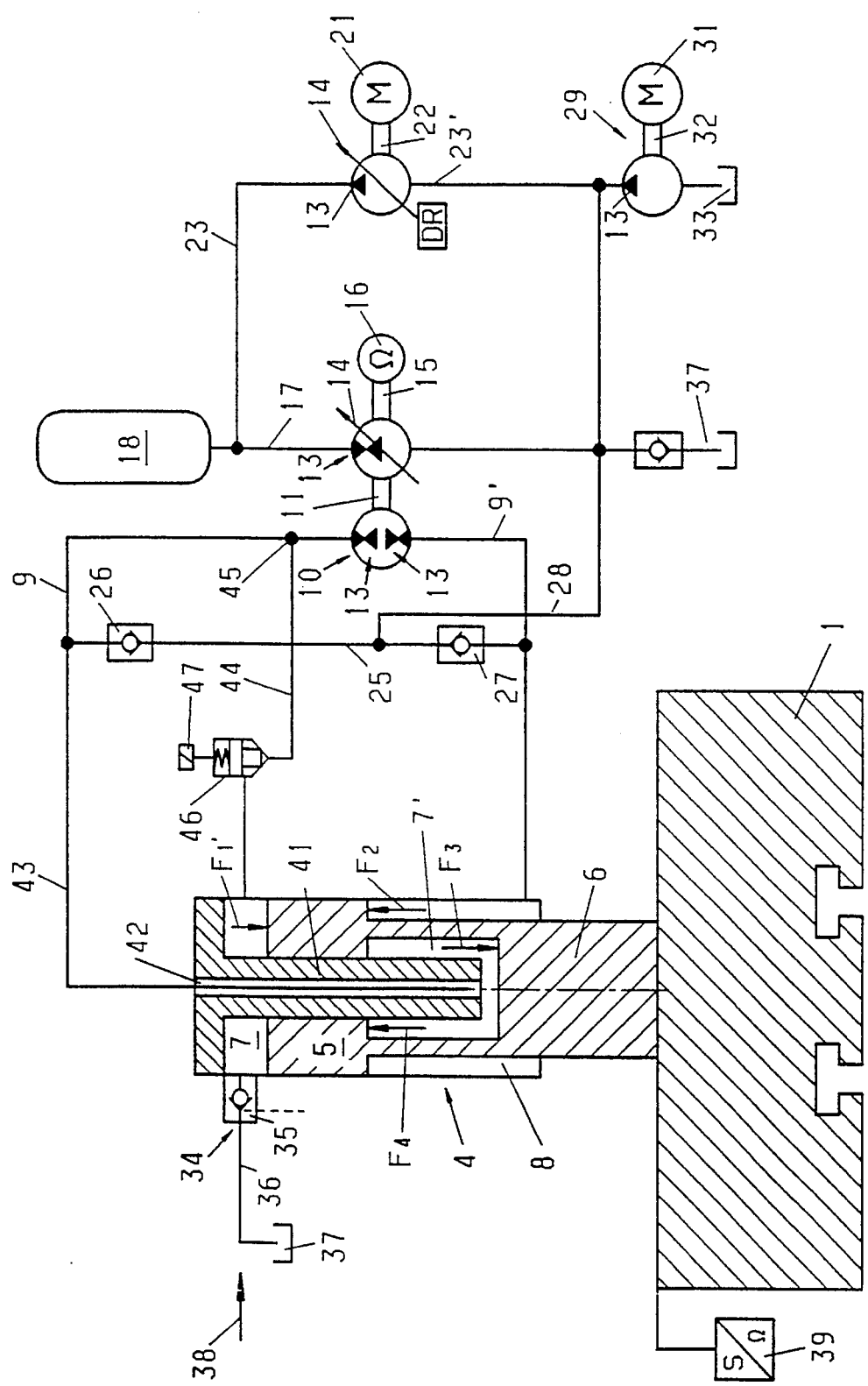
FIG. 3 shows a schematic representation of a further exemplary embodiment with a piston/cylinder unit with driving piston.

The exemplary embodiment according to FIG. 3 shows an alternative exemplary embodiment of the invention for carrying out the method according to the invention. In order additionally to assist the downward movement of the working piston 5, a further cylinder chamber 7' is provided inside the working piston 5 with piston rod 6, which cylinder chamber 7' can likewise be acted upon with pressure medium. To this end, the working cylinder 4 has an additional cylinder rod 41 with a bore 42 which passes through the upper cylinder chamber 7, the working piston 5 and the piston rod 6 in a stationary manner. In this way the upper cylinder chamber 7 similarly becomes an annular cylinder chamber with a reduced effective contact surface $F_1'$. The additional cylinder chamber 7' has a lower circular working surface $F_3$ and an upper annular surface $F_4$, the effective surface $F_3-F_4$ resulting for the output force. The cylinder rod 41 is arranged stationary inside the cylinder 4 and extends so far into the cylinder chamber 7' that a complete stroke of the press ram 1 can be carried out. The cylinder chamber 7' is connected via the bore 42 to a line 43, which is connected to the line 9 in the exemplary embodiment according to FIGS. 1 and 2. The rest of the arrangement of drive and control units corresponds to the exemplary embodiment according to FIG. 1. Reference is made to the corresponding description.

Since the line 9 is connected to the cylinder chamber 7', an additional line 44 branches off from the line 9 at an intersection point 45 and is connected via a two-way seat valve 46 to the annular cylinder chamber 7. The two-way seat valve 46 is activated by a pilot valve 47, the pilot valve 47 being driven by the displacement measuring device 39. If this two-way seat valve 46 is closed, then only the cylinder chamber 7' is acted upon with pressure medium, as is described in the exemplary embodiment **recylinder* chamber 7. By means of a controlled opening of the two-way seat valve 46, the cylinder chamber 7 is additionally acted upon with pressure medium, so that the working surface $F_1'$ additionally comes into action. In this way the downward movement of the piston 5 with piston rod 6 is additionally accelerated.

The invention is not limited to the exemplary embodiment illustrated and described. Instead, it also includes all specialist developments within the scope of the inventive concept.

We claim:

1. A method for controlling the drive of a hydraulic press, comprising the steps of:
   (A) providing a piston/cylinder unit having a piston connected to a press ram, a first cylinder chamber located below the piston, and a second cylinder chamber acted upon by the piston;
   (B) utilizing an operating phase in which potential energy associated with a raised, unloaded press ram is stored, the operating phase including the steps of:
       (1) allowing the press ram to move downward to drive the piston;
       (2) forcing a hydraulic medium to flow from the first cylinder chamber, through a first hydraulic device, and into the second cylinder chamber using the piston;
       (3) operating the first hydraulic device as a first hydraulic motor using the hydraulic medium forced therethrough;
       (4) driving a second hydraulic device using the first hydraulic motor to cause the second hydraulic device to pump additional hydraulic medium into an accumulator unit to charge the accumulator unit so that the potential energy associated with the downward movement of the unloaded press ram is stored; and
       (5) further charging the accumulator unit with the additional hydraulic medium using a hydraulic pump;
   (C) driving the hydraulic pump using an electric motor;
   (D) controlling a pressure of the hydraulic medium using an adjustable swivel angle of the hydraulic pump; and
   (E) utilizing a subsequent shaping or machining phase, comprising the steps of:
       (1) using the charge within the accumulator unit to at least partially cause the additional hydraulic medium therein to flow through the second hydraulic device, and causing the second hydraulic device to operate as a second hydraulic motor; and
       (2) driving the first hydraulic device using the second hydraulic motor to cause the first hydraulic device to pump the hydraulic medium into the second cylinder chamber, whereby the piston effects an additional pressure actuation on the press ram.

2. The method defined in claim 1, wherein said further charging step includes operating the hydraulic pump as a pressure-controlled hydraulic pump to build up a necessary, nominal pressure level in the accumulator unit.

3. The method defined in claim 1, wherein the using step of the subsequent phase includes using the hydraulic pump to build up a necessary pressure required by the second hydraulic device.

4. The method defined in claim 1, further comprising the steps of passing a piston rod, connected to the piston and to the press ram, through a center of the first cylinder chamber, so that the first cylinder chamber has an annular cross section; and forming the second cylinder chamber to have a circular cylindrical cross section.

5. The method defined claim 1, further comprising the steps of measuring one of a ram displacement and ram speed of the press ram using at least one measuring device; and regulating a pressure of the hydraulic medium by controlling the second hydraulic device using the measuring device.

6. The method defined in claim 1, wherein the operating phase includes the further steps of rapidly traversing the press ram; and recovering the potential energy of any downwardly moving components to at least partially charge the accumulator unit.

7. A method for controlling the drive of a hydraulic press, comprising the steps of:
   (A) providing a piston/cylinder unit having a piston connected to a press ram, a first cylinder chamber located below the piston, and a second cylinder chamber acted upon by the piston, the second cylinder chamber having a greater volume displaceable per unit of time than the first cylinder chamber;
   (B) attaching a prefill unit to the second cylinder chamber, and using the prefill unit to provide extra hydraulic medium corresponding to a volume difference between the second cylinder chamber and the first cylinder chamber during a movement of the piston;
   (C) utilizing an operating phase in which potential energy associated with a raised, unloaded press ram is stored, the operating phase including the steps of:
       (1) allowing the press ram to move downward to drive the piston;
       (2) forcing hydraulic medium to flow from the first cylinder chamber, through a first hydraulic device, and into the second cylinder chamber using the piston;
       (3) operating the first hydraulic device as a first hydraulic motor using the hydraulic medium forced therethrough;
       (4) driving a second hydraulic device using the first hydraulic motor to cause the second hydraulic device to pump additional hydraulic medium into an accumulator unit to charge the accumulator unit so that the potential energy associated with the downward movement of the unloaded press ram is stored; and
       (5) further charging the accumulator unit with the additional hydraulic medium using a third hydraulic device; and
   (D) utilizing a subsequent shaping or machining phase, comprising the steps of:
       (1) using the charge within the accumulator unit to at least partially cause the additional hydraulic medium therein to flow through the second hydraulic device, and causing the second hydraulic device to operate as a second hydraulic motor; and
       (2) driving the first hydraulic device using the second hydraulic motor to cause the first hydraulic device to pump the hydraulic medium into the second cylinder chamber, whereby the piston effects an additional pressure actuation on the press ram.

8. The method defined in claim 7, wherein the third hydraulic device is a hydraulic pump; further comprising the steps of controlling a pressure of the hydraulic medium using an adjustable swivel angle of the third hydraulic device; and driving the third hydraulic device using an electric motor.

9. The method defined in claim 7, further comprising the step of providing the prefill unit with a prefill tank for storing the extra hydraulic medium, and an externally openable nonreturn valve located between the prefill tank and the second cylinder chamber.

10. A method for controlling the drive of a hydraulic press, comprising the steps of:
(A) providing a piston/cylinder unit having a piston connected to a press ram, a first cylinder chamber located below the piston, and a second cylinder chamber acted upon by the piston, the second cylinder chamber, a first hydraulic device, and the first cylinder chamber being connected together in series using a hydraulic connection line;
(B) connecting the second cylinder chamber and the first cylinder chamber together using a further hydraulic line connected in parallel to the hydraulic connection line, and having two nonreturn valves therein, each opening and closing in opposite directions;
(C) connecting an additional hydraulic line to the further hydraulic line between the two nonreturn valves;
(D) leading the additional hydraulic line to a further hydraulic device for precharging the first and second cylinder chambers with a hydraulic medium;
(E) utilizing an operating phase in which potential energy associated with a raised, unloaded press ram is stored, the operating phase including the steps of:
 (1) allowing the press ram to move downward to drive the piston;
 (2) forcing the hydraulic medium to flow from the first cylinder chamber, through the first hydraulic device, and into the second cylinder chamber using the piston;
 (3) operating the first hydraulic device as a first hydraulic motor using the hydraulic medium forced therethrough;
 (4) driving a second hydraulic device using the first hydraulic motor to cause the second hydraulic device to pump additional hydraulic medium into an accumulator unit to charge the accumulator unit so that the potential energy associated with the downward movement of the unloaded press ram is stored; and
 (5) further charging the accumulator unit with the additional hydraulic medium using a third hydraulic device; and
(F) utilizing a subsequent shaping or machining phase, comprising the steps of:
 (1) using the charge within the accumulator unit to at least partially cause the additional hydraulic medium therein to flow through the second hydraulic device, and causing the second hydraulic device to operate as a second hydraulic motor; and
 (2) driving the first hydraulic device using the second hydraulic motor to cause the first hydraulic device to pump the hydraulic medium into the second cylinder chamber, whereby the piston effects an additional pressure actuation on the press ram.

11. A method for controlling the drive of a hydraulic press, comprising the steps of:
(A) providing a piston/cylinder unit having a piston connected to a press ram, a first cylinder chamber located below the piston, and a second cylinder chamber acted upon by the piston;
(B) utilizing an operating phase in which potential energy associated with a raised, unloaded press ram is stored, the operating phase including the steps of:
 (1) allowing the press ram to move downward to drive the piston;
 (2) forcing a hydraulic medium to flow from the first cylinder chamber, through a first hydraulic device, and into the second cylinder chamber using the piston;
 (3) operating the first hydraulic device as a first hydraulic motor using the hydraulic medium forced therethrough;
 (4) driving a second hydraulic device using the first hydraulic motor to cause the second hydraulic device to pump additional hydraulic medium into an accumulator unit to charge the accumulator unit so that the potential energy associated with the downward movement of the unloaded press ram is stored; and
 (5) further charging the accumulator unit with the additional hydraulic medium using a third hydraulic device;
(C) controlling a volume flow of the hydraulic medium using a swivel angle adjustment of the second hydraulic device;
(D) controlling a speed of the second hydraulic device using a speed measuring device connected thereto; and
(E) utilizing a subsequent shaping or machining phase, comprising the steps of:
 (1) using the charge within the accumulator unit to at least partially cause the additional hydraulic medium therein to flow through the second hydraulic device, and causing the second hydraulic device to operate as a second hydraulic motor; and
 (2) driving the first hydraulic device using the second hydraulic motor to cause the first hydraulic device to pump the hydraulic medium into the second cylinder chamber, whereby the piston effects an additional pressure actuation on the press ram.

12. A method for controlling the drive of a hydraulic press, comprising the steps of:
(A) providing a piston/cylinder unit having a piston connected to a press ram, a first cylinder chamber located below the piston, and a second cylinder chamber acted upon by the piston;
(B) utilizing an operating phase in which potential energy associated with a raised, unloaded press ram is stored, the operating phase including the steps of:
 (1) allowing the press ram to move downward to drive the piston;
 (2) forcing a hydraulic medium to flow from the first cylinder chamber, through a first hydraulic device, and into the second cylinder chamber using the piston;
 (3) operating the first hydraulic device as a first hydraulic motor using the hydraulic medium forced therethrough;
 (4) driving a second hydraulic device using the first hydraulic motor to cause the second hydraulic device to pump additional hydraulic medium into an accumulator unit to charge the accumulator unit so that the potential energy associated with the downward movement of the unloaded press ram is stored; and
 (5) further charging the accumulator unit with the additional hydraulic medium using a third hydraulic device, the third hydraulic device being a pressure-controlled hydraulic pump;
(C) generating a nominal pressure of the hydraulic medium using an adjustable swivel angle of the third hydraulic device by altering a volume flow of the hydraulic medium; and
(D) utilizing a subsequent shaping or machining phase, comprising the steps of:
 (1) using the charge within the accumulator unit to at least partially cause the additional hydraulic medium therein to flow through the second hydraulic device, and causing the second hydraulic device to operate as a second hydraulic motor; and (2) driving the first hydraulic device using the second hydraulic motor to cause the first hydraulic device to pump the hydraulic medium into the Second cylinder chamber, whereby the piston effects an additional pressure actuation on the press ram.

13. A method for controlling the drive of a hydraulic press, comprising the steps of:

(A) providing at least two piston/cylinder units, each having a piston connected to a press ram, a first cylinder chamber located below the piston, and a second cylinder chamber acted upon by the piston;

(B) controlling the piston/cylinder units independent of each other;

(C) utilizing an operating phase in which potential energy associated with a raised, unloaded press ram is stored, the operating phase including the steps of:

(1) allowing the press ram to move downward to drive the pistons;

(2) forcing a hydraulic medium to flow from the first cylinder chambers, through a first hydraulic device, and into the second cylinder chambers using the pistons;

(3) operating the first hydraulic device as a first hydraulic motor using the hydraulic medium forced therethrough;

(4) driving a second hydraulic device using the first hydraulic motor to cause the second hydraulic device to pump additional hydraulic medium into an accumulator unit to charge the accumulator unit so that the potential energy associated with the downward movement of the unloaded press ram is stored; and (5) further charging the accumulator unit with the additional hydraulic medium using a third hydraulic device; and (D) utilizing a subsequent shaping or machining phase, comprising the steps of:

(1) using the charge within the accumulator unit to at least partially cause the additional hydraulic medium therein to flow through the second hydraulic device, and causing the second hydraulic device to operate as a second hydraulic motor; and (2) driving the first hydraulic device using the second hydraulic motor to cause the first hydraulic device to pump the hydraulic medium into the second cylinder chambers, whereby the pistons effect an additional pressure actuation on the press ram.

14. A method for controlling the drive of a hydraulic press, comprising the steps of:

(A) providing a piston/cylinder unit having a piston connected to a press ram, a first cylinder chamber located below the piston, and a second cylinder chamber acted upon by the piston;

(B) utilizing an operating phase in which potential energy associated with a raised, unloaded press ram is stored, the operating phase including the steps of:

(1) allowing the press ram to move downward to drive the piston;

(2) forcing a hydraulic medium to flow from the first cylinder chamber, through a first hydraulic device, and into the second cylinder chamber using the piston;

(3) operating the first hydraulic device as a first hydraulic motor using the hydraulic medium forced therethrough;

(4) driving a second hydraulic device using the first hydraulic motor to cause the second hydraulic device to pump additional hydraulic medium into an accumulator unit to charge the accumulator unit so that the potential energy associated with the downward movement of the unloaded press ram is stored; and (5) further charging the accumulator unit with the additional hydraulic medium using a third hydraulic device;

(C) controlling a parallelism of the press ram by regulating a speed of the second hydraulic device in dependence on a generated signal representative of a press ram position; and (D) utilizing a subsequent shaping or machining phase, comprising the steps of:

(1) using the charge within the accumulator unit to at least partially cause the additional hydraulic medium therein to flow through the second hydraulic device, and causing the second hydraulic device to operate as a second hydraulic motor; and (2) driving the first hydraulic device using the second hydraulic motor to cause the first hydraulic device to pump the hydraulic medium into the second cylinder chamber, whereby the piston effects an additional pressure actuation on the press ram.

15. A method for controlling the drive of a hydraulic press, comprising the steps of:

(A) providing at least two piston/cylinder units, each having a piston connected to a respective press ram, and each including a first cylinder chamber located below the piston, and a second cylinder chamber acted upon by the piston;

(B) connecting each press ram to a common central supply comprising an accumulator unit and a third hydraulic device;

(C) utilizing an operating phase in which potential energy associated with a raised, unloaded press ram is stored, the operating phase including the steps of:

(1) allowing the press rams to move downward to drive the pistons;

(2) forcing a hydraulic medium to flow from the first cylinder chambers, through a first hydraulic device, and into the second cylinder chambers using the pistons;

(3) operating the first hydraulic device as a first hydraulic motor using the hydraulic medium forced therethrough;

(4) driving a second hydraulic device using the first hydraulic motor to cause the second hydraulic device to pump additional hydraulic medium into the accumulator unit to charge the accumulator unit so that the potential energy associated with the downward movement of the unloaded press rams is stored; and (5) further charging the accumulator unit with the additional hydraulic medium using the third hydraulic device; and (D) utilizing a subsequent shaping or machining phase, comprising the steps of:

(1) using the charge within the accumulator unit to at least partially cause the additional hydraulic medium therein to flow through the second hydraulic device, and causing the second hydraulic device to operate as a second hydraulic motor; and (2) driving the first hydraulic device using the second hydraulic motor to cause the first hydraulic device to pump the hydraulic medium into the second cylinder chambers, whereby the pistons effect an additional pressure actuation on the press rams.

16. A method for controlling the drive of a hydraulic press, comprising the steps of:

(A) providing a piston/cylinder unit having a piston connected to a press ram, a first cylinder chamber located below the piston, and a second cylinder chamber acted upon by the piston;

(B) passing a piston rod, connecting the piston to the press ram, through a center of the first cylinder chamber, so that the first cylinder chamber has an annular cross section;

(C) forming the second cylinder chamber to have an annular cross section;

(D) connecting a further cylinder chamber located in the piston/cylinder unit in parallel to the second cylinder chamber;

(E) accelerating a downward movement of the piston using the further cylinder chamber and the second cylinder chamber;

(F) utilizing an operating phase in which potential energy associated with a raised, unloaded press ram is stored, the operating phase including the steps of:

(1) allowing the press ram to move downward to drive the piston;

(2) forcing a hydraulic medium to flow from the first cylinder chamber, through a first hydraulic device, and into the second cylinder chamber using the piston;

(3) operating the first hydraulic device as a first hydraulic motor using the hydraulic medium forced therethrough;

(4) driving a second hydraulic device using the first hydraulic motor to cause the second hydraulic device to pump additional hydraulic medium into an accumulator unit to charge the accumulator unit so that the potential energy associated with the downward movement of the unloaded press ram is stored; and (5) further charging the accumulator unit with the additional hydraulic medium using a third hydraulic device; and (G) utilizing a subsequent shaping or machining phase, comprising the steps of:

(1) using the charge within the accumulator unit to at least partially cause the additional hydraulic medium therein to flow through the second hydraulic device, and causing the second hydraulic device to operate as a second hydraulic motor; and (2) driving the first hydraulic device using the second hydraulic motor to cause the first hydraulic device to pump the hydraulic medium into the second cylinder chamber, whereby the piston effects an additional pressure actuation on the press ram.

17. The method defined in claim 16, further comprising the step of passing a stationary cylinder rod having a bore therein through the second cylinder chamber, the piston, and the piston rod.

18. The method defined in claim 16, further comprising the step of passing the hydraulic medium from the first hydraulic device and through a two-way seat valve to act upon the second cylinder chamber and the further cylinder chamber.

19. The method defined in claim 18, further comprising the step of controlling a pilot valve using a displacement measuring device located on the press ram to activate the two-way seat valve.

* * * * *